(12) United States Patent
Reepmeyer et al.

(10) Patent No.: US 11,892,003 B2
(45) Date of Patent: Feb. 6, 2024

(54) APPLICATION OF MACHINE LEARNING TO PROCESS HIGH-FREQUENCY SENSOR SIGNALS OF A TURBINE ENGINE

(71) Applicant: General Electric Company, Schenectady, NY (US)

(72) Inventors: James Ryan Reepmeyer, Cincinnati, OH (US); Johan Michael Reimann, Ballston Spa, NY (US); Gagan Adibhatla, Cincinnati, OH (US); Evin Nathaniel Barber, Cincinnati, OH (US); Stefan Joseph Cafaro, Maineville, OH (US); Rahim Panjwani, Cincinnati, OH (US); Frederick John Menditto, III, Maineville, OH (US); Aaron James Schmitz, Cincinnati, OH (US); Suchot Kongsomboonvech, Mason, OH (US); Richard Anthony Zelinski, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 1228 days.

(21) Appl. No.: 16/294,358

(22) Filed: Mar. 6, 2019

(65) Prior Publication Data
US 2020/0284265 A1    Sep. 10, 2020

(51) Int. Cl.
| F04D 27/00 | (2006.01) |
| G01M 15/14 | (2006.01) |
| G05B 13/02 | (2006.01) |
| G06N 3/04 | (2023.01) |
| F04D 27/02 | (2006.01) |
| G06N 3/044 | (2023.01) |
| G06N 3/045 | (2023.01) |

(52) U.S. Cl.
CPC ......... *F04D 27/001* (2013.01); *F04D 27/02* (2013.01); *F04D 27/0207* (2013.01);
(Continued)

(58) Field of Classification Search
CPC .... F04D 27/001; F04D 27/02; F04D 27/0207; F04D 27/0246; F04D 27/0253;
(Continued)

(56) References Cited

U.S. PATENT DOCUMENTS

| 6,164,902 A | 12/2000 | Irwin et al. |
| 7,827,803 B1 * | 11/2010 | Wadia .............. F02C 7/057 |
| | | 60/39.27 |

(Continued)

OTHER PUBLICATIONS

European Search Report Corresponding to U.S. Appl. No. 20/160,732 dated Jun. 30, 2020.

*Primary Examiner* — Loren C Edwards
(74) *Attorney, Agent, or Firm* — Dority & Manning, P.A.

(57) ABSTRACT

A control system for active stability management of a compressor element of a turbine engine is provided. In one example aspect, the control system includes one or more computing devices configured to receive data indicative of an operating characteristic associated with the compressor element. For instance, the data can be received from a high frequency sensor operable to sense pressure at the compressor element. The computing devices are also configured to determine, by a machine-learned model, a stall margin remaining of the compressor element based at least in part on the received data. The machine-learned model is trained to recognize certain characteristics of the received data and associate the characteristics with a stall margin remaining of the compressor element. The computing devices are also configured to cause adjustment of one or more engine systems based at least in part on the determined stall margin remaining.

20 Claims, 9 Drawing Sheets

(52) U.S. Cl.
CPC ..... *F04D 27/0246* (2013.01); *F04D 27/0253* (2013.01); *G01M 15/14* (2013.01); *G05B 13/027* (2013.01); *G06N 3/04* (2013.01); *G06N 3/044* (2023.01); *G06N 3/045* (2023.01); *F05D 2270/101* (2013.01); *F05D 2270/709* (2013.01)

(58) Field of Classification Search
CPC ........ F01D 21/003; G01M 15/14; F02C 9/00; G05B 13/027; G06N 3/04; G06N 3/0445; G06N 3/0454
See application file for complete search history.

(56) References Cited

U.S. PATENT DOCUMENTS

| | | | |
|---|---|---|---|
| 7,904,282 B2 | 3/2011 | Goebel et al. | |
| 7,987,081 B2 | 7/2011 | Lopez et al. | |
| 8,539,783 B1 | 9/2013 | Bunch | |
| 9,604,735 B2 | 3/2017 | Helle et al. | |
| 9,796,479 B2 | 10/2017 | Tucker et al. | |
| 9,805,606 B2 | 10/2017 | Coulmeau et al. | |
| 2010/0269481 A1 | 10/2010 | Snider et al. | |
| 2010/0296914 A1 | 11/2010 | Staroselsky et al. | |
| 2012/0096961 A1* | 4/2012 | Schleif | F01D 17/08 73/866.5 |
| 2014/0093350 A1* | 4/2014 | Meisner | F01D 17/08 415/17 |
| 2014/0100703 A1* | 4/2014 | Dull | F03D 17/00 700/289 |
| 2015/0096296 A1 | 4/2015 | Banker et al. | |
| 2015/0184549 A1 | 7/2015 | Pamujula et al. | |
| 2015/0324501 A1 | 11/2015 | Desell et al. | |
| 2017/0089258 A1 | 3/2017 | Ritter et al. | |
| 2017/0175646 A1 | 6/2017 | Adibhatla | |
| 2017/0218854 A1 | 8/2017 | Nestico et al. | |
| 2017/0283085 A1 | 10/2017 | Kearns et al. | |
| 2017/0356346 A1 | 12/2017 | Jiang et al. | |
| 2017/0369190 A1 | 12/2017 | Ethington et al. | |

* cited by examiner

APPLICATION OF MACHINE LEARNING TO PROCESS HIGH-FREQUENCY SENSOR SIGNALS OF A TURBINE ENGINE

FIELD

The subject matter of the present disclosure relates generally to control systems for gas turbine engines, and more particularly to real-time processing of high-frequency sensor data of gas turbine engines using machine-learned models.

BACKGROUND

Gas turbine engines can include one or more compressors. A compressor active stability management (CASM) system can be used to protect the engine from compressor stall. For instance, CASM systems can receive sensor data and interpret the sensor data in some way to represent impending stall or stall margin remaining. Then, based on the interpreted signal, CASM systems can rapidly cut fuel to the engine and/or cause variable geometry components to move to avoid stall. However, conventional CASM systems have been unable to capture certain features in the sensor data that can be indicative of degrading stall margin. Moreover, conventional CASM systems typically require long processing times to interpret the received sensor data. As a result, the stall margin remaining is generated too slowly or not accurate enough to support an active CASM system that directly controls to a specified operability margin.

Accordingly, an engine having a control system that addresses one or more of the challenges noted above would be useful. Moreover, a method for controlling an engine that addresses one or more of the challenges noted above would be beneficial.

BRIEF DESCRIPTION

Aspects and advantages of the invention will be set forth in part in the following description, or may be obvious from the description, or may be learned through practice of the invention.

In one aspect, a control system for an engine having a compressor element is provided. The control system includes one or more computing devices having one or more memory devices and one or more processing devices, the one or more memory devices storing computer-readable instructions that can be executed by the one or more processing devices to perform operations. In performing the operations, the one or more processing devices are configured to: receive data indicative of an operating characteristic associated with the compressor element and determine, by a machine-learned model, a stall margin remaining of the compressor element based at least in part on the received data.

In another aspect, a method is provided. The method includes operating an engine having a compressor element. Further, the method includes receiving, by one or more computing devices, data indicative of an operating characteristic associated with the compressor element of the engine. The method also includes determining, by a machine-learned model of the one or more computing devices, a stall margin remaining of the compressor element based at least in part on the received data.

In yet another aspect, a method for controlling a turbine engine is provided. The method includes operating the turbine engine; setting, by one or more computing devices, a target signal associated with the turbine engine; receiving, by the one or more computing devices, data indicative of an operating characteristic associated with the turbine engine; predicting, by a machine-learned model of the one or more computing devices, a signal based at least in part on the received data; determining, by the one or more computing devices, a signal error based at least in part on the predicted signal and the target signal, and causing, by the one or more computing devices, adjustment of one or more engine systems of the turbine engine based at least in part on the determined signal error.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
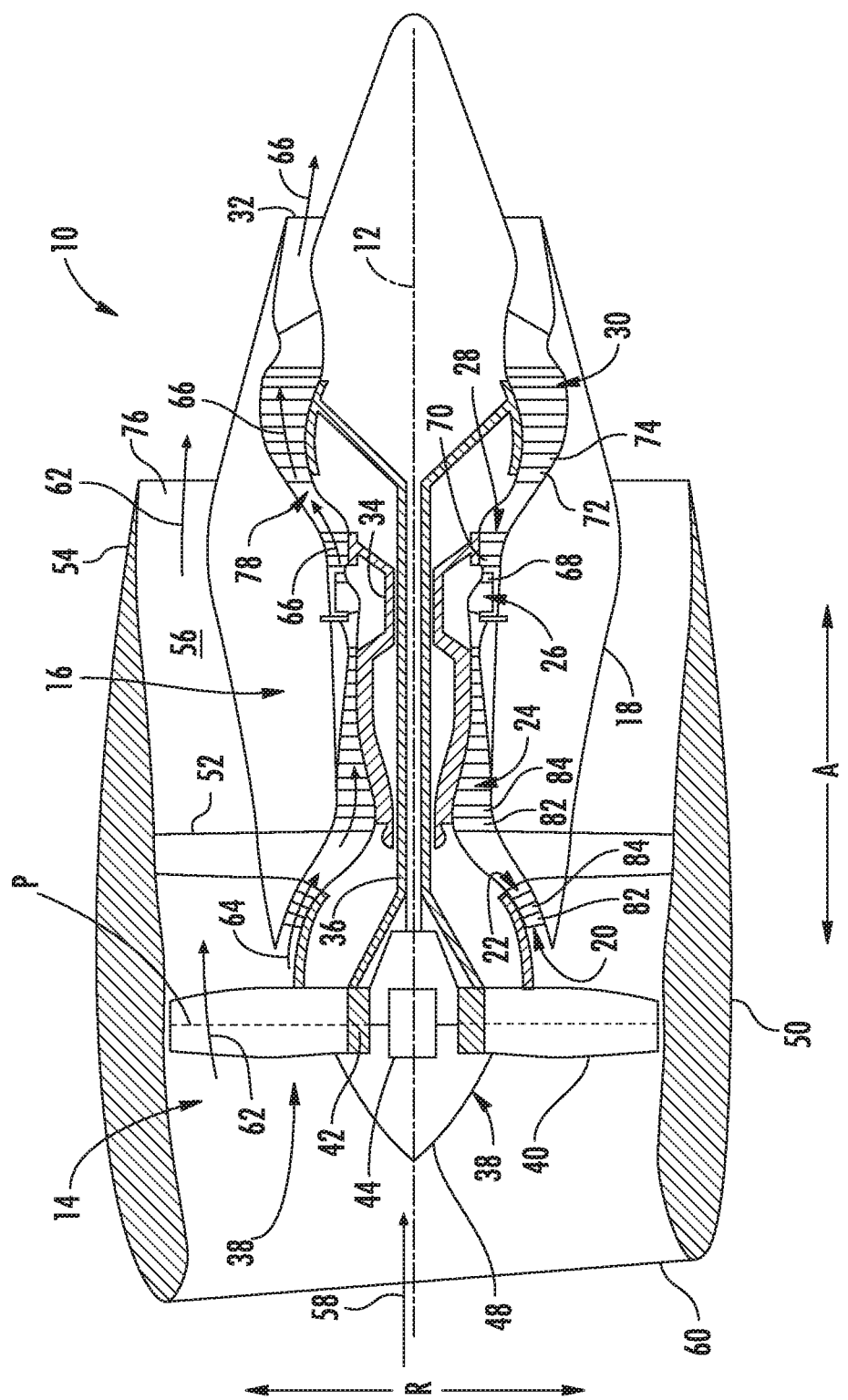
FIG. 1 provides a schematic cross-sectional view of a gas turbine engine in accordance with an example embodiment of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows. Further, as used herein, the terms "axial" or "axially" refer to a dimension along a longitudinal axis of an engine. The term "forward" used in conjunction with "axial" or "axially" refers to a direction toward the engine inlet, or a component being relatively closer to the engine inlet as compared to another component. The term "rear" used in conjunction with "axial" or "axially" refers to a direction toward the engine nozzle, or a component being relatively closer to the engine nozzle as compared to another component. The terms "radial" or "radially" refer to a dimension extending between a center longitudinal axis of the engine and an outer engine circumference. Furthermore, as used herein, terms of approximation, such as "approximately," "substantially," or "about," refer to being within a fifteen percent (15%) margin of error unless otherwise stated. Furthermore, as used herein, the term "real time" refers to at least one of the time of occurrence of the associated events, the time of measurement and collection of predetermined data, the time to process the data, and the time of a system response to the events and the environment. In the embodiments described herein, these activities and events occur substantially instantaneously.

A control system for a turbine engine is provided. More particularly, a control system for active stability management of a compressor element is provided. In one example aspect, the control system includes one or more computing devices having one or more memory devices and one or more processing devices. The one or more memory devices store computer-readable instructions that can be executed by the one or more processing devices to perform operations. In performing the operations, the one or more processing devices are configured to receive data indicative of an operating characteristic associated with the compressor element. For instance, the data can be received from a high frequency sensor operable to sense pressure fluctuations caused by blade tip vortices at the compressor element. The frequency at which the sensor reads the operating characteristic associated with the compressor element (e.g., the pressure fluctuations at the compressor element) can be on the order of two thousand times (2,000×) the update rate of the one or more computing devices.

The one or more processing devices are also configured to determine, by a machine-learned model in real time, a stall margin remaining of the compressor element based at least in part on the received data. The machine-learned model can be a neural network, e.g., a recurrent or convolutional neural network. The machine-learned model can be trained to recognize certain characteristics of the received data. For instance, the machine-learned model can be trained to recognize one or more characteristics of the AC component of the received raw data, e.g., frequency characteristics, amplitude characteristics, and/or other pattern or characteristics of the AC component of the data. The machine-learned model can be trained to associate the frequency characteristics, amplitude characteristics, and/or other pattern or characteristics of the AC component of the data sensor with a stall margin remaining of the compressor element. In some embodiments, the machine-learned model is trained to recognize one or more characteristics of the DC component of the received data to enhance the accuracy of the determined stall margin remaining signal.

The one or more processing devices are further configured to determine a stall margin error based at least in part on the determined stall margin remaining and a target stall margin remaining. Then, the one or more processing devices are configured to cause adjustment of one or more engine systems based at least in part on the determined stall margin remaining, or more particularly, based at least in part on the stall margin error. The one or more processing devices can continuously cause adjustment of the engine systems to drive the stall margin error to zero (0). That is, the one or more processing devices can continuously cause adjustment of the engine systems to drive the predicted stall margin remaining (i.e., the stall margin remaining output by the machine-learned model) to the target stall margin. Methods for controlling turbine engines using such a control system are also provided.

The systems and methods described herein may provide a number of technical effects, benefits, and improvements to control systems for turbine engines and computing technology thereof. In one aspect, the machine-learned model of the computing system(s) of the present disclosure can produce a highly accurate and high bandwidth stall margin remaining signal in real time that enables the use of an active stability management system. Enabling active real-time control over compressor stall margin requires a robust, accurate, and high bandwidth stall margin remaining signal. The improved stall margin remaining signal enables downstream control logic to push the operating line closer to stall than stall margin remaining signals produced by conventional control schemes. This allows for thrust growth and/or for improved cycle efficiency. Additionally, the stall margin remaining signal generated by the machine-learned model disclosed herein can be further leveraged to assist in prognostic health management (PHM) applications, including enhanced digital/embedded models and compressor health monitoring.

In addition, in utilizing a machine-learned model to generate a stall margin remaining signal, computer-processing times may be significantly reduced and processing resources may be used for other core processing functions, among other benefits. Conventional methods are unable to fully capture all features in the sensor data that can be indicative of degrading stall margin and thus require longer periods of processing time to produce an accurate signal. The result is a signal too slow to support an active stability management control system. The control system described herein is operable to produce an accurate stall margin remaining signal that satisfies the criteria required to enable an active stability management control system.

FIG. 1 provides a schematic cross-sectional view of a gas turbine engine in accordance with an example embodiment of the present disclosure. For the depicted embodiment of FIG. 1, the gas turbine engine is a high-bypass turbofan jet engine 10, referred to herein as "turbofan 10." The turbofan 10 can be mounted to an aerial vehicle, such as e.g., a fixed-wing aircraft. As shown in FIG. 1, the turbofan 10 defines an axial direction A, a radial direction R, and a circumferential direction. Moreover, the turbofan 10 defines an axial centerline or longitudinal axis 12 that extends therethrough for reference purposes. In general, the longitudinal axis 12 and the axial direction A extend parallel to one another, the radial direction R extends inward toward and outward from the longitudinal axis 12 orthogonal to the axial direction A, and the circumferential direction extends concentrically around the longitudinal axis 12.

The turbofan 10 includes a fan section 14 and a core turbine engine 16 disposed downstream of the fan section 14. The core turbine engine 16 includes a substantially tubular outer casing 18 that defines an annular core inlet 20. The outer casing 18 encases, in serial flow relationship, a compressor section including a booster or low pressure (LP) compressor 22 and a high pressure (HP) compressor 24; a combustor section including a combustor 26; a turbine section including a high pressure turbine 28 and a low pressure turbine 30; and a jet exhaust nozzle section 32. A high pressure shaft or spool 34 drivingly connects the HP turbine 28 to the HP compressor 24. A low pressure shaft or spool 36 drivingly connects the LP turbine 30 to the LP compressor 22.

Each compressor 22, 24 can include a plurality of compressor elements. Particularly, for this embodiment, each compressor 22, 24 of the turbofan 10 includes a plurality of compressor stages, with each stage including both an annular array of stationary compressor vanes 82 and an annular array of rotating compressor blades 84 positioned immediately downstream of the compressor vanes 82. Additionally, the compressors 22, 24 can include one or more variable geometry components 86 (FIG. 2), including inlet guide vanes (IGVs), outlet guide vanes (OGVs), variable stator vanes, etc. Further, one or more bleed valves 88 (FIG. 2) can be positioned along the compressor 24 and/or compressor 22 and are operable to move open and closed such that pressurized air can be bled from the core air flowpath of the core engine 16 of the turbofan 10. The bleed air bled through the bleed valves 88 can be routed to other engine systems, such as e.g., an active clearance control system for the HP turbine 28, or to various vehicle systems to which the engine is attached, such as e.g., a cabin air pressure system for pressurizing the cabin of an aircraft.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36.

Referring still to the exemplary embodiment of FIG. 1, the disk 42 is covered by rotatable spinner 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 can extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustor 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It will be appreciated that, although described with respect to turbofan 10 having core turbine engine 16, the present subject matter may be applicable to other types of turbomachinery. For example, the present subject matter may be suitable for use with or in turboprops, turboshafts, turbojets, industrial and marine gas turbine engines, and/or auxiliary power units.

Figure 2:
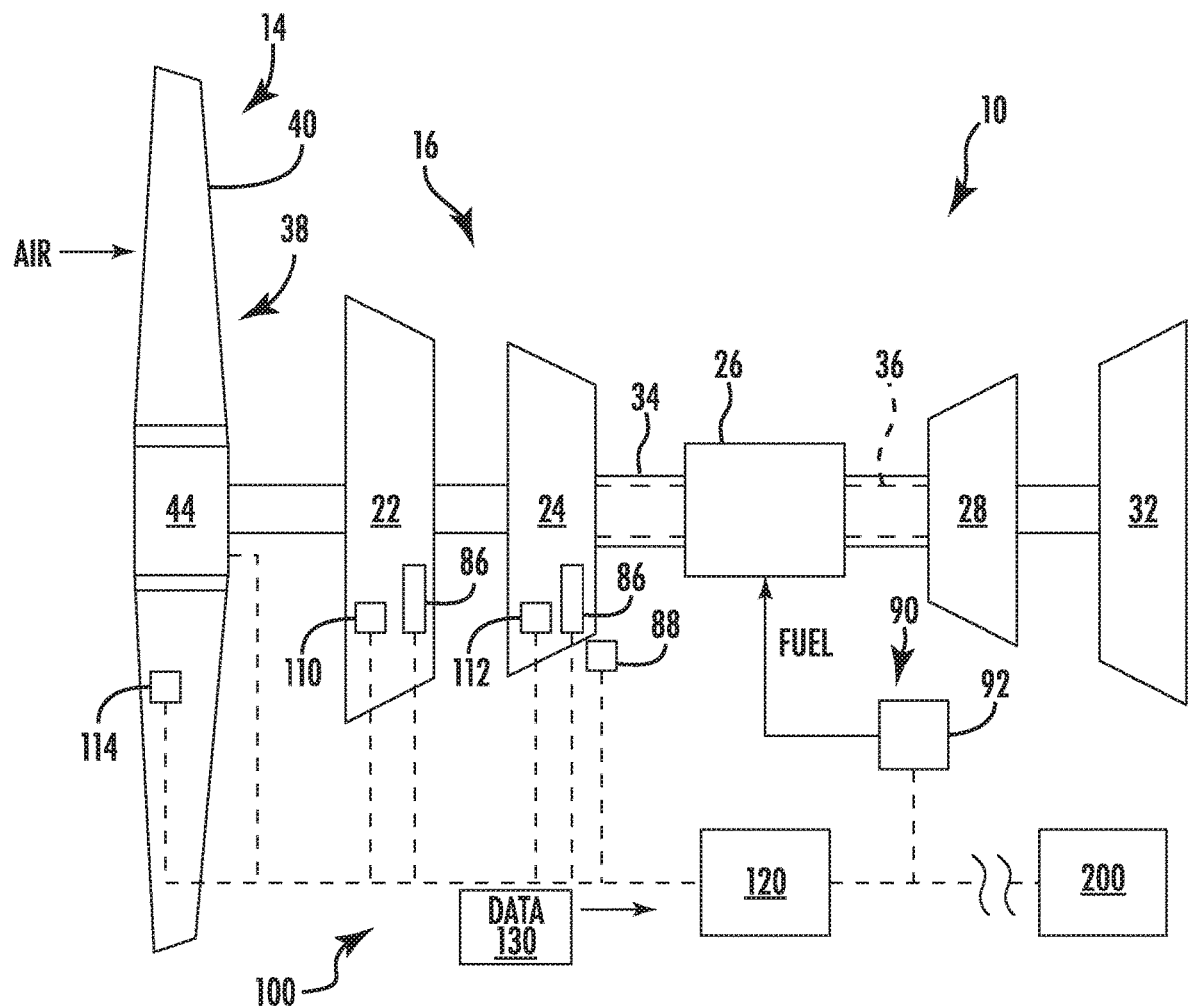
FIG. 2 provides a schematic view of the gas turbine engine of FIG. 1 and depicts a control system thereof.

FIG. 2 provides a schematic view of the turbofan 10 of FIG. 1 and depicts a control system 100 thereof. For this embodiment, the control system 100 can be a compressor active stability management (CASM) system. As shown, the control system 100 can include a number of sensors for sensing various operating characteristics of the engine, e.g., during operation of the engine. Particularly, the control system 100 includes a sensor 110 operable to sense an operating characteristic associated with a compressor element of the LP compressor or booster 22. For this embodiment, the sensor 110 is a pressure sensor operable to sense pressure fluctuations at a compressor element of the booster 22. Thus, the operating characteristic is pressure or the pressure at a compressor element of the booster 22 in this example. Further, for this embodiment, the sensor 110 is a high bandwidth pressure sensor. However, in alternative embodiments, the sensor 110 can sense other operating characteristics associated with the compressor element of the booster 22, such as e.g., temperature. As used herein, the term "compressor element" can mean an array of vanes or blades in a particular stage of a compressor, a single vane or blade of a stage of the compressor, multiple stages of vanes and blades, and/or the compressor as a whole.

The control system 100 also includes a sensor 112 operable to sense an operating characteristic associated with a compressor element of the HP compressor 24. For this embodiment, the sensor 112 is a pressure sensor operable to sense pressure fluctuations at a compressor element of the HP compressor 24. Further, the sensor 112 is a high bandwidth pressure sensor. However, in alternative embodiments, the sensor 112 can sense other operating characteristics of the HP compressor 24, such as e.g., temperature. The control system 100 also includes a sensor 114 operable to sense an operating characteristic associated with a compressor element of the fan 38. For this embodiment, the sensor 114 is a pressure sensor operable to sense pressure fluctuations at a compressor element of the fan 38, such as e.g., pressure fluctuations at the fan blades 40. Further, the sensor 114 is a high bandwidth pressure sensor. However, in alternative embodiments, the sensor 114 can sense other operating characteristics of the fan 38, such as e.g., temperature.

In addition, the control system 100 of the turbofan 10 includes one or more computing devices for controlling operation of the turbofan 10. Particularly, for this embodiment, the control system 100 includes a controller 120 configured for controlling various aspects of the turbofan 10. Specifically, the controller 120 is configured to perform one or more operations or functions for stability control of one or both compressors 22, 24 of the turbofan 10 and for providing improved performance of the engine during its life cycle. The controller 120 can include one or more memory devices and one or more processing devices. The one or more memory devices can store computer-readable instructions that can be executed by the one or more processing devices to perform operations. Particularly, the controller 120 can be configured in substantially the same manner as one of the computing devices of the exemplary computing system 500 described below with reference to FIG. 13 (and can be configured to perform one or more of the operations described herein, such as some or all of the operations of the methods (400), (450) described herein). The controller 120 can be a system of controllers or a single controller. In some embodiments, the controller 120 can be an engine controller. The controller 120 can be, for example, an Electronic Engine Controller (EEC) or an Electronic Control Unit (ECU). The controller 120 can be operated as a control device of a Full Authority Digital Engine Control (FADEC) system of a vehicle, such as e.g., an aerial vehicle.

The controller 120 is communicatively coupled with various components of the turbofan engine 10 as shown in FIG. 2 (e.g., via one or more suitable wired and/or wireless communication links). For this embodiment, the controller 120 is communicatively coupled with the sensors 110, 112, 114, fuel metering device 92 of the fuel system 90, variable geometry components 86 of the LP and HP compressors 22, 24, as well as the actuation member 44 of the fan 38. As will be appreciated the controller 120 can be communicatively coupled with other components of the turbofan engine 10, to other computing systems or components of a vehicle to which the turbofan engine 10 is mounted, to various remote computing systems 200 or components (e.g., a ground system, a maintenance entity, an analytics entity, etc.), as well as other components or computing systems.

Figure 3:
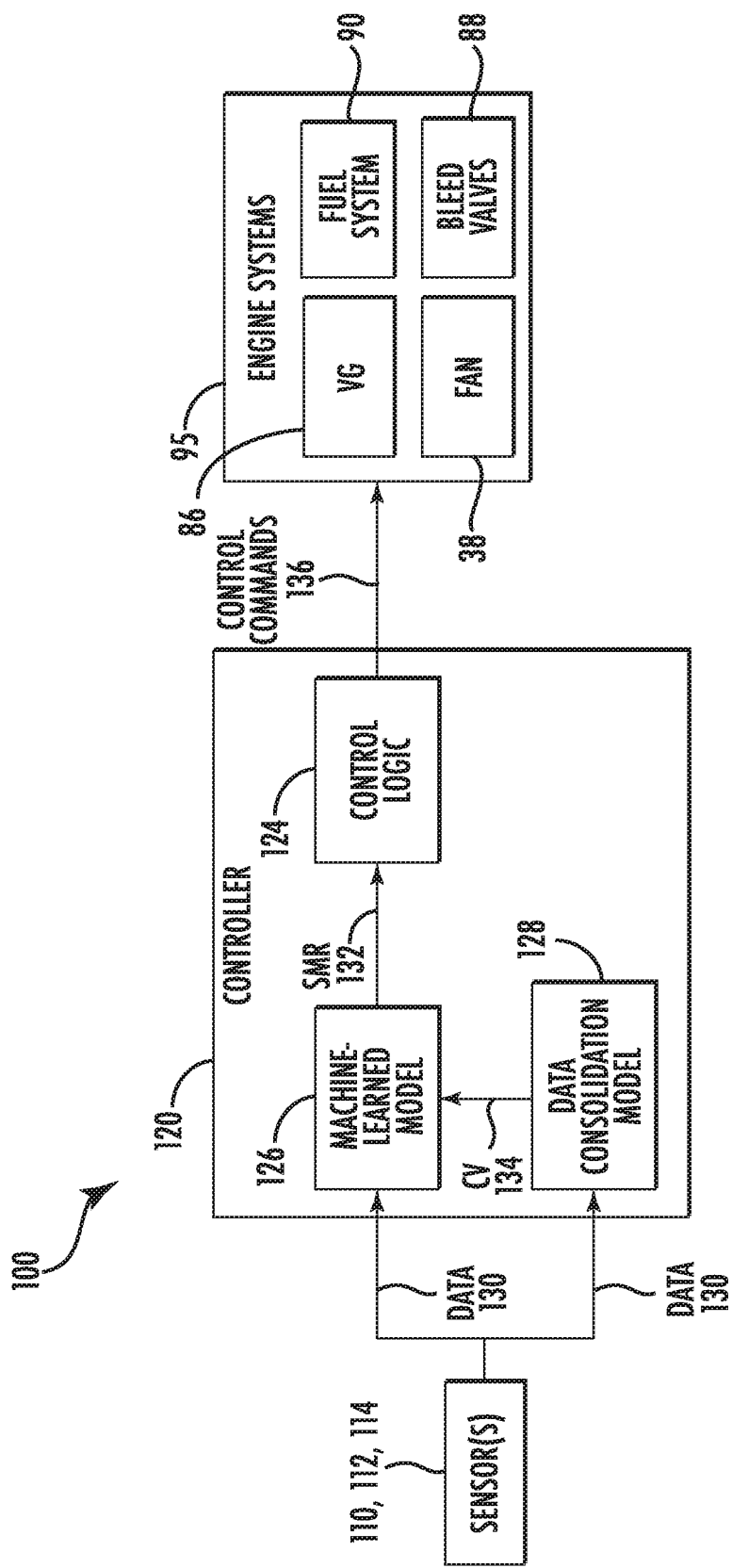
FIG. 3 provides a schematic view of the control system of FIG. 2.

FIG. 3 provides a schematic view of the control system 100 and depicts various models and control logic of the controller 120. As shown, the controller 120 includes control logic 124, a machine-learned model 126, and a data consolidation model 128. In some embodiments, the controller 120 can optionally not include the data consolidation model 128.

Generally, the machine-learned model 126 of the controller 120 is configured to receive raw data 130 from a high frequency sensor, such as e.g., one or more of sensors 110, 112, 114 and translate or convert the high frequency sensor data 130 into a stall margin remaining 132 (denoted as "SMR" in FIG. 3) of a compressor element in real time with significant improvements in signal accuracy and variation over conventional methods. Thus, in some embodiments, at least one input to the machine-learned model 126 is high frequency, high bandwidth sensor data 130 and the output of the machine-learned model 126 is a stall margin remaining 132 of a compressor element. Improvements in stall margin remaining signal accuracy and processing speed achieved by use of the machine-learned model 126 can provide enhanced active stability management of the compressor element.

In some embodiments, the machine-learned model 126 is a neural network. For instance, in some embodiments, the machined-learned model 126 is a recurrent neural network (RNN), e.g., a long short-term memory recurrent neural network (LSTM). In yet other embodiments, the machined-learned model 126 is a convolutional neural network (CNN). In some further embodiments, the machine-learned model can be another type of neural network. Moreover, in some embodiments, the machine-learned model 126 can be a model structured as one of a linear discriminant analysis model, a partial least squares discriminant analysis model, a support vector machine model, a random tree model, a logistic regression model, a naïve Bayes model, a K-nearest neighbor model, a quadratic discriminant analysis model, an anomaly detection model, a boosted and bagged decision tree model, a C4.5 model, and/or a k-means model.

In some embodiments, supervised training techniques can be used to train the machine-learned model 126. For instance, supervised training techniques can be used on a labeled training data set to train the machine-learned model 126. The labeled training data set can include raw data from a high frequency sensor at known operating conditions of the engine and expected stall margin remaining calculations that correspond to the raw data. The training process iterates until the error delta that describes a difference between the output of the machine-learned model 126 and the expected stall margin remaining output is within a threshold percentage. In this way, the machine-learned model is constructed within arbitrarily good precision to the training data set. The machine-learned model 126 can be trained using the labeled training data and can also be validated via a validation data set. In yet other embodiments, the machine-learned model 126 can be trained using one or more unsupervised training techniques. Once trained, and in some instances validated, the machine-learned model 126 is operable to receive high bandwidth, high frequency sensor data and predict compressor element stall margin with significant improvements in signal accuracy and variation over conventional methods, as noted above.

For this embodiment, the controller 120 also includes data consolidation model 128. The data consolidation model 128 can be a single model or a plurality of models. The data consolidation model 128 can include physics-based models, mathematical models, statistical models, a combination thereof, etc. Generally, the data consolidation model 128 of the controller 120 is configured to receive raw data 130 from a high frequency sensor, such as e.g., one or more of sensors 110, 112, 114, and ultimately output a correlation value 134, denoted as "CV" in FIG. 3. The correlation value 134 can be routed to and input into the machine-learned model 126. Thus, in some embodiments, the machine-learned model 126 is a multi-input machine-learned model. Stated generally, the correlation value 134 can provide insight or information pertaining to the physics or behavior of the compressor element. For instance, as one example, the correlation value can be representative of how well or close the raw data signal from one revolution of the engine matches the raw data signal from a subsequent or second revolution of the engine. For instance, the data consolidation model 128 can use one or more Fourier Transforms to determine various characteristics of the raw data signals so that the signals can be compared more easily and accurately. Generally, the more comparable the raw data signals between revolutions, the healthier the compressor element; in contrast, the less comparable the raw data signals from one revolution to the next, the less healthier the compressor element. The machine-learned model 126 can use the correlation value 134 output by the data consolidation model in addition to its machine-learned algorithm to determine the stall margin remaining 132 of the compressor element. The insight into the physics of the compressor element can provide enhanced accuracy, among other benefits and advantages.

Further, the controller 120 also includes control logic 124. As shown, the control logic 124 receives the determined stall margin remaining 132 and can cause adjustment of one or more engine systems 95 based at least in part on the determined stall margin remaining 132. For instance, based on the determined stall margin remaining 132, the control logic 124 can generate one or more control commands 136 indicative of instructions for adjusting one or more of the engine systems 95 of the engine. As shown in FIG. 3, the one or more engine systems 95 can include one or more variable geometry components 86, fuel metering device 92 (FIG. 2) of fuel system 90, fan 38, and/or bleed valves 88 of the engine. As the stall margin remaining signal 132 is processed with improved speed and accuracy via use of the machine-learned model 126, the control logic 124 can more accurately determine optimal control commands 136 for controlling the engine system 95 to ultimately provide improved stall prevention capabilities and operation closer to the stall line for a given engine speed. More aggressive compressor active stability management and control logic 124 can translate to increased thrust for engines.

Figure 4:
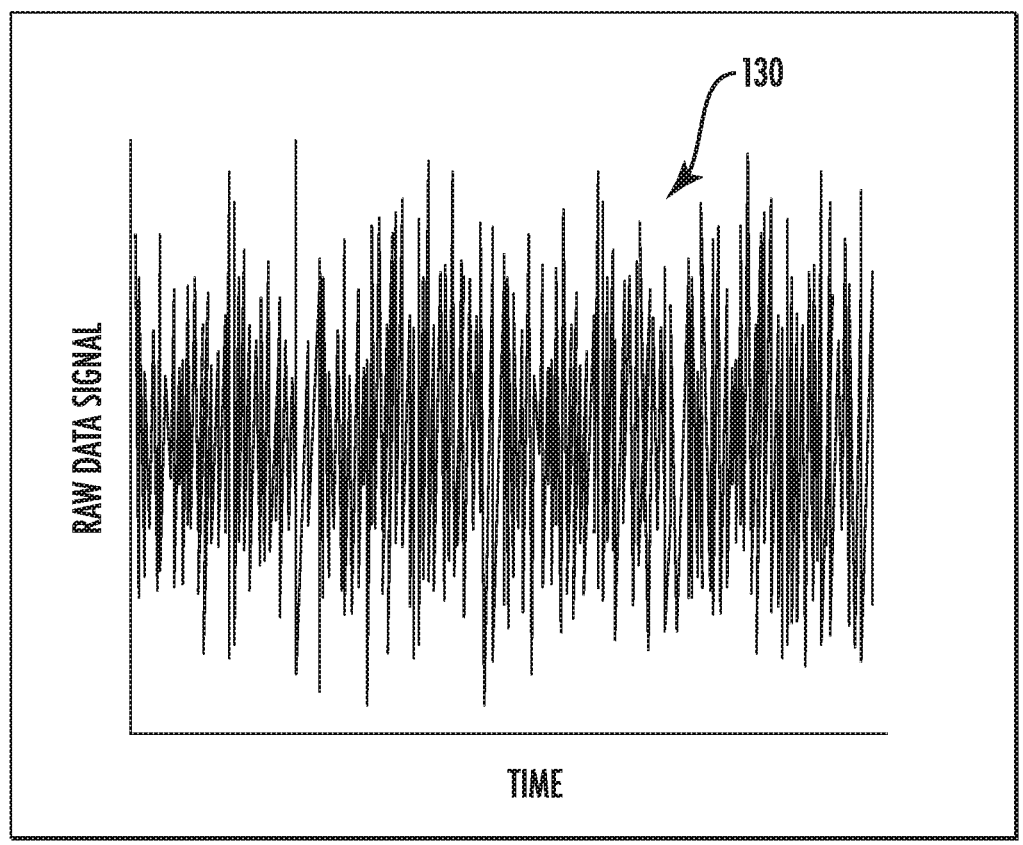
FIG. 4 provides a graph depicting a data signal as a function of time in accordance with an example embodiment of the present subject matter.

With reference generally to FIGS. 2 and 3, the control system 100 can control the turbofan engine 10 to operate closer to stall with improved performance to achieve the benefits and advantages described above in the following example manner. As depicted, the controller 120 is configured to receive data 130 indicative of an operating characteristic associated with a compressor element of the engine. For instance, the controller 120 can receive data 130 from sensor 110 that is indicative of an operating characteristic associated with a compressor element of the booster 22. Additionally or alternatively, the controller 120 can receive data 130 from sensor 112 that is indicative of an operating characteristic associated with a compressor element of the HP compressor 24. Additionally or alternatively, the controller 120 can receive data 130 from sensor 114 that is indicative of an operating characteristic associated with a compressor element of the fan 38. The data 130 can be routed from one or more of the sensors 110, 112, 114 to the controller 120 via a suitable wired or wireless communication link. The raw data 130 can be routed to the controller 120 continuously during operation of the turbofan 10. The data 130 can be routed as an analog and/or digital signal. For instance, FIG. 4 graphically depicts a raw data signal 130 as a function of time that can be received by the controller 120. The raw data signal 130 depicted in FIG. 4 is an analog signal. The raw data signal 130 can be indicative of an operating characteristic associated with the compressor element.

For instance, in some example embodiments, the operating characteristic associated with the compressor element is at least one of a pressure and a temperature at the compressor element. As noted above, the sensors 110, 112, 114 can be high bandwidth, high frequency pressure sensors. In alternative embodiments, the sensors 110, 112, 114 can be high bandwidth, high frequency temperature sensors. In some example embodiments, the compressor element can be an array of compressor blades 84 (FIG. 1) of one of the compressors 22, 24 and the operating characteristic can be the pressure at the array of compressor blades 84. Particularly, the pressure sensor can be operable to sense pressure fluctuations caused by blade tip vortices as the blades of the array rotate past the sensor. In yet another example, the compressor element can be the compressor 22 or the compressor 24 and the operating characteristic can be the pressure at the compressor 22 or the compressor 24. As yet another example, the compressor element can be a single compressor blade 84 of one of the compressors 22, 24 and the operating characteristic can be the pressure at the single compressor blade 84. In a further example, the compressor element can be the fan 38 or a single blade 40 of the fan 38 and the operating characteristic can be the pressure at the blades 40.

The raw data 130 can be routed directly to the machine-learned model 126, and optionally, directly to the data consolidation model 128 as well. The controller 120 is configured to determine, by the machine-learned model 126, the stall margin remaining 132 of the compressor element based at least in part on the received data 130. For instance, the machine-learned algorithm of the machine-learned model 126 can receive the raw data 130 and can generate or determine a highly accurate and high bandwidth stall margin remaining signal 132. As noted above, the machine-learned model 126 can be an RNN or CNN model. In some embodiments, the machine-learned model 126 is trained to recognize one or more characteristics of the AC component of the received raw data 130. For instance, the machine-learned model 126 can recognize frequency characteristics, amplitude characteristics, and/or other pattern or characteristics of the AC component of the raw data sensor signal. The machine-learned model can be trained to associate the frequency characteristics, amplitude characteristics, and/or other pattern or characteristics of the AC component of the raw data sensor signal with a stall margin remaining of the compressor element. In embodiments in which the machine-learned model 126 is an RNN, the RNN can use its internal state or memory to process sequences of inputs to accurately and quickly determine the stall margin remaining 132. Additionally, in yet other embodiments, the machine-learned model 126 is trained to recognize one or more characteristics of the DC component of the received raw data signal 130 to enhance the accuracy of the determined stall margin remaining signal 132. The determined stall margin remaining signal 132 can be output by the model with equal to or greater than about ten times (10×) improvement in signal variation over conventional methods for determining stall margin remaining.

Figure 5:
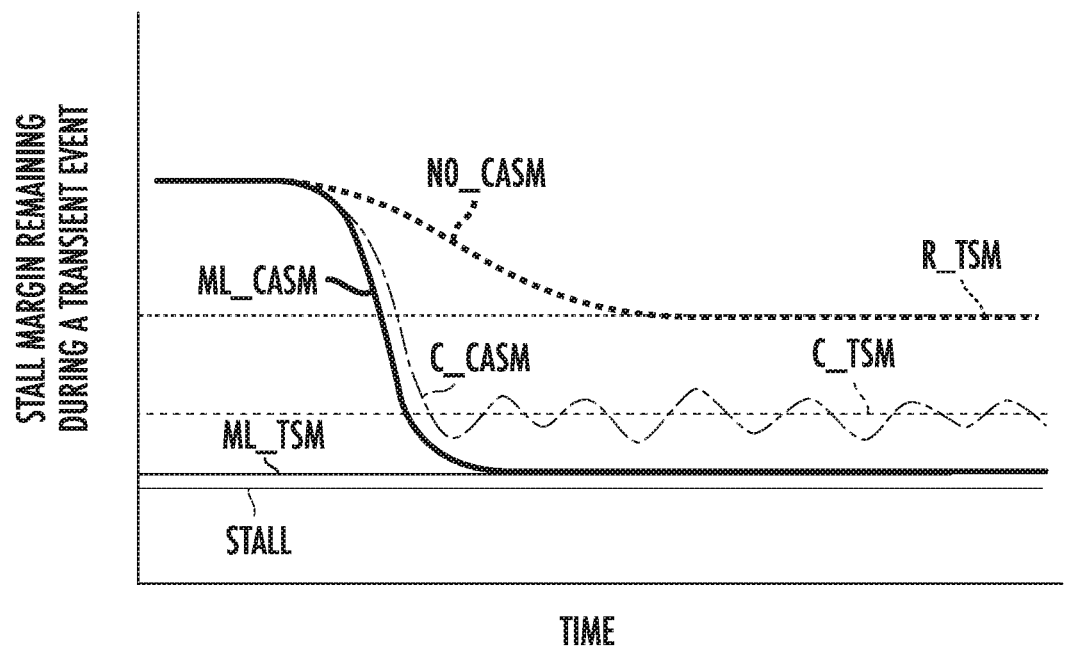
FIG. 5 provides a graph depicting the stall margin remaining of a compressor element versus time during a transient event for various control schemes in accordance with an example embodiment of the present subject matter.

FIG. 5 provides a graph depicting the stall margin remaining of the compressor element versus time during a transient event for various control schemes. The transient event can be a burst, for example. As depicted, the control schemes depicted in FIG. 5 include a "no CASM" system control scheme NO_CASM, a conventional CASM system control scheme C_CASM, and in accordance with inventive aspects of the present disclosure, a machine learning CASM system control scheme ML_CASM.

For the NO_CASM control scheme, there is no CASM system used to prevent stall during the transient event as depicted in FIG. 5. As shown, the stall margin remaining for the compressor element initially decreases rapidly and eventually settles at a required margin, denoted as R_TSM, during the transient event. Notably, with the no CASM system, stall is prevented as the system operates with a relatively high required margin, or R_TSM. However, as the system settles relatively far away from stall, performance during the transient event is not ideal.

For the C_CASM control scheme, a conventional CASM system is used to prevent stall during the transient event and to drive the stall margin remaining to a stall margin remaining target, denoted as C_TSM. As illustrated, the stall margin remaining for the compressor element decreases rapidly initially and slightly undershoots the target stall margin C_TSM during the transient event. Thereafter, the conventional system C_CASM actively drives the stall margin remaining of the compressor element to the target stall margin C_TSM, e.g., by adjusting the fuel to the engine. Thus, for this example, stall is prevented utilizing the conventional system C_CASM; however, notably, some operability margin is lost as represented by the spacing between the stall margin remaining for the C_CASM and the stall line.

For the ML_CASM control scheme, a machine learning control scheme in accordance with the present disclosure is utilized to prevent stall during the transient event and to drive the stall margin remaining as close as possible to the Stall line, e.g., to increase the operability margin of the compressor element, and more broadly, the engine. Particularly, the controller 120 (FIG. 3) can set a target stall margin much closer to Stall, denoted by ML_TSM. As illustrated, the stall margin remaining for the compressor element initially decreases rapidly and then smoothly settles on the target stall margin ML_CASM during the transient event. Thus, for this example, stall is prevented utilizing the machine learning system ML_CASM during the transient event and the operability margin of the compressor element is improved over the C_CASM and NO_CASM system control schemes, as highlighted by the proximity of the stall margin remaining relative to Stall achieved with the ML_CASM system compared to the proximity of the stall margin remaining relative to Stall achieved by the conventional C_CASM and NO_CASM systems.

As will be explained below, the stall margin remaining of the compressor element can be determined or generated by the controller 120 by the machine-learned model 126 (FIG. 3) based at least in part on received high frequency sensor data, the controller 120 can monitor the stall margin remaining and actively drive the stall margin remaining 132 to about the stall line or at some margin or target from stall, e.g., the ML_TSM. For instance, the controller 120 can cause adjustment of the one or more engine systems 95 (FIG. 3) based at least in part on the determined stall margin remaining. For example, the controller 120 can cause adjustment of one or more variable geometries of the engine to track the set target stall margin. Additionally or alternatively, fuel flow to the engine can be changed, e.g., reduced. Additionally or alternatively, other methods of changing the mass flow through the compressor can be utilized.

Figure 6:
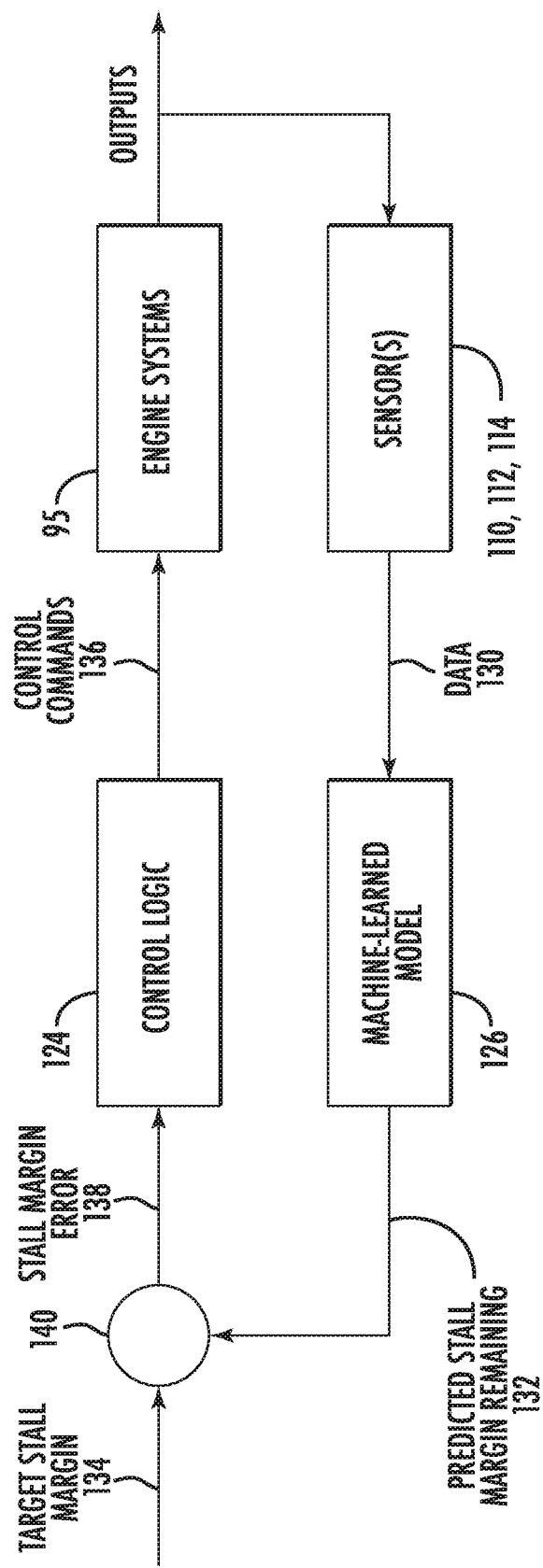
FIG. 6 provides a block diagram of an example control loop for active stability management of a compressor element in accordance with an example embodiment of the present subject matter.

FIG. 6 provides a block diagram of an example control loop for active stability management of a compressor element in accordance with an example embodiment of the present subject matter. As shown in FIG. 6, as the engine operates, one or more of the sensors 110, 112, 114 can sense an operating characteristic associated with the compressor element of the engine. For instance, the operating characteristic can be the pressure at the compressor element as previously noted. The high bandwidth, high frequency raw data 130 indicative of the operating characteristic of the compressor element can be routed to the machine-learned model 126 of the controller 120. The machine-learned model 126 can convert the raw high frequency pressure data 130 into the stall margin remaining signal 132 as described above. That is, the machine-learned model 126 can predict the stall margin remaining 132 based at least in part on the received data 130. The stall margin remaining signal 132 is then routed to a summation block 140. At the summation block 140, the controller 120 can determine a stall margin error 138 based at least in part on the determined stall margin remaining 132 and the target stall margin 134 set by the controller 120, e.g., automatically or via a user input. For instance, the stall margin error 138 can be calculated as the difference between the determined stall margin remaining 132 and the target stall margin 134. The stall margin error 138 can be representative of the margin between the stall margin remaining signal and the target stall margin. For instance, with reference to FIG. 5, the stall margin error can be representative of the margin or difference between the stall margin remaining of the ML_CASM line and the target stall margin ML_TSM.

The determined stall margin error 138 can then be input into the control logic 124. The control logic 124 can output one or more control commands 136 based at least in part on the determined stall margin error 138. For instance, the output control commands 136 can provide instructions for causing adjustment of the one or more engine systems 95 such that the stall margin error 138 is driven to zero (0), or as closely as possible to zero (0). In this way, the stall margin remaining signal 132 can be driven to the target stall margin 134, e.g., during a transient event as shown in FIG. 5. Thus, the one or more processing devices of the controller 120 are configured to cause adjustment of the one or more engine systems 95 based at least in part on the determined stall margin error 138, which ultimately changes the mass flow through the compressor element and consequently drives the stall margin remaining signal 132 to the target stall margin 134.

In some embodiments, in determining, by the machine-learned model 126, the stall margin remaining 132 of the compressor element based at least in part on the received data 130, the one or more processing devices of the controller 120 are configured to splice the received data 130 into data subsets indicative of the operating characteristic of the compressor element over one or more revolutions of the engine. In such embodiments, the stall margin remaining 132 of the compressor element is determined based at least in part on the data subsets indicative of the operating characteristic of the compressor element over one or more revolutions of the engine.

Figure 7:
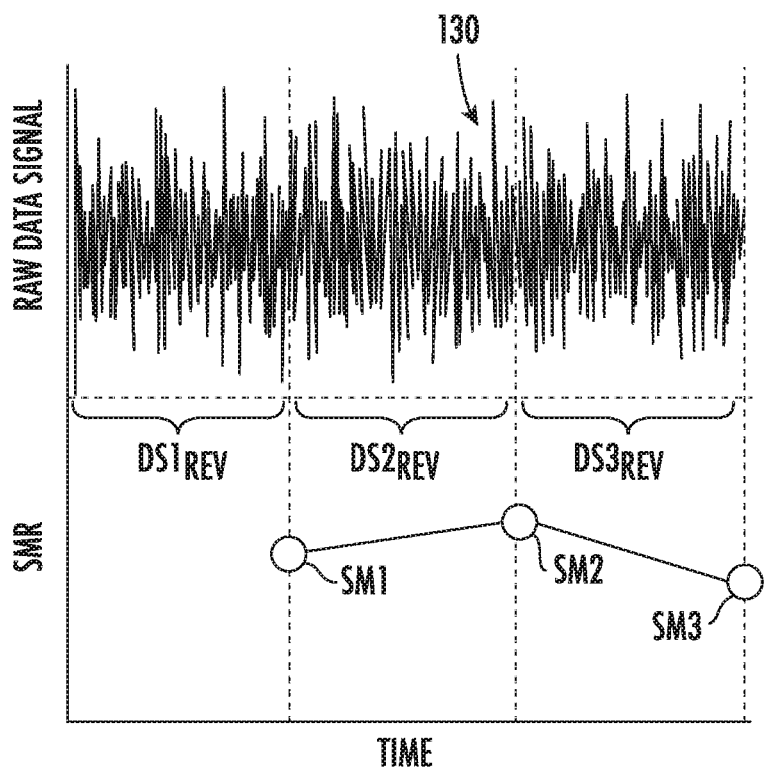
FIG. 7 provides a graph depicting a spliced raw data signal as a function of time and a corresponding determined stall margin remaining signal in accordance with an example embodiment of the present subject matter.

By way of example, FIG. 7 graphically depicts raw data signal 130 spliced into data subsets by revolution of the engine as well as the stall margin remaining signal 132 determined based at least in part on the spliced data signal. As depicted in FIG. 7, the one or more processing devices of the controller 120 can splice the received data 130 into data subsets by revolution of the engine. For instance, the data 130 can be spliced into a first data subset $DS1_{REV}$ for a first revolution of the engine, a second data subset $DS2_{REV}$ for a subsequent second revolution of the engine, and a third data subset $DS3_{REV}$ for a subsequent third revolution of the engine. That is, the data is spliced into subsets based on the time it takes the engine to revolve around its axis of rotation. In this way, the revolutions of the engine and data splicing are synchronous. The revolution of the engine can be taken as the core speed (N2) of the engine if the compressor element is operatively coupled with the HP shaft 34 (FIG. 2) or can be taken as the fan speed (N1) of the engine if the compressor element is operatively coupled with the LP shaft 36 or fan 38.

For each data subset $DS1_{REV}$, $DS2_{REV}$, $DS3_{REV}$ associated with a revolution of the engine, a corresponding stall margin remaining data point is determined by the machine-learned model 126. For this example, a stall margin remaining SM1 can be determined based at least in part on the spliced first data subset $DS1_{REV}$ associated with the first revolution, a stall margin remaining SM2 can be determined based at least in part on the spliced second data subset $DS2_{REV}$ associated with the second revolution, and a stall margin remaining SM3 can be determined based at least in part on the spliced third data subset $DS3_{REV}$ associated with the third revolution. The data points SM1, SM2, and SM3 can be plotted over time. The determined stall margin remaining data points SM1, SM2, and SM3 can be routed to the control logic 124 (FIG. 3) as they are determined such that the stall margin remaining can actively be driven to the stall margin remaining target 134 (e.g., so that the stall margin error 138 can be driven to zero (0)).

In yet other embodiments, in determining, by the machine-learned model 126, the stall margin remaining 132 of the compressor element based at least in part on the received data 130, the one or more processing devices of the controller 120 are configured to splice the received data 130 into data subsets indicative of the operating characteristic of the compressor element over an update interval that is synchronized with an update rate of the one or more computing devices, or in this example, the controller 120 and/or FADEC system of which the controller 120 is the control device thereof. For instance, if the FADEC has an update rate of X milliseconds, the raw data 130 can be spliced at intervals of X milliseconds. In such embodiments, the stall margin remaining 132 of the compressor element is determined based at least in part on the data subsets indicative of the operating characteristic of the compressor element over an update interval that is synchronized with an update rate of the one or more computing devices.

Figure 8:
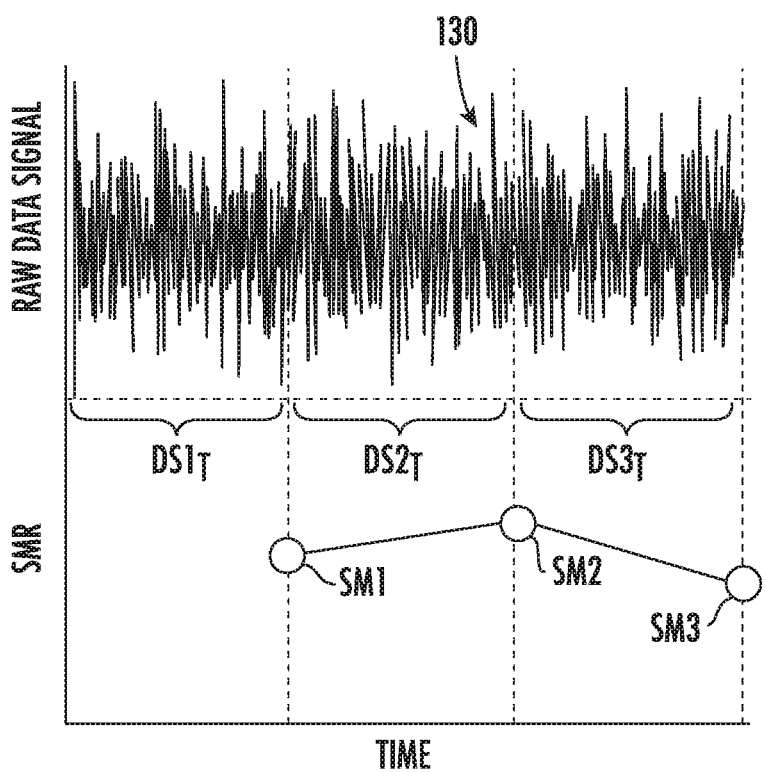
FIG. 8 provides another graph depicting a spliced raw data signal as a function of time and a corresponding determined stall margin remaining signal in accordance with an example embodiment of the present subject matter.

By way of example, FIG. 8 graphically depicts a raw data signal 130 spliced by an update interval that is synchronized with an update rate of the one or more computing devices as a function of time as well as the stall margin remaining signal 132 determined based at least in part on the spliced data signal. As depicted in FIG. 8, the one or more computing devices can splice the received data 130 into data subsets by an update interval that is synchronized with an update rate (e.g., time step) of the one or more computing devices. For instance, the data 130 can be spliced into a first data subset $DS1_T$ for a first update interval, a second data subset $DS2_T$ for a subsequent second update interval (which can be the same or a different amount of time as the first update interval), and a third data subset $DS3_T$ for a subsequent third update interval (which can be the same or a different amount of time as the first update interval and/or the second update interval). That is, the data 130 is spliced into subsets based on the time it takes the one or more computing devices to refresh or update. The update rate of the one or more computing devices can be fixed or variable, and consequently, the update interval can also be fixed or variable depending on the update rate.

As shown in FIG. 8, for each data subset $DS1_T$, $DS2_T$, $DS3_T$ associated with an update interval, a corresponding stall margin remaining data point is determined by the machine-learned model 126. For this example, a stall margin remaining SM1 can be determined based at least in part on the spliced first data subset $DS1_T$ associated with the first update interval or time period, a stall margin remaining SM2 can be determined based at least in part on the spliced second data subset $DS2_T$ associated with the second update interval, and a stall margin remaining SM3 can be determined based at least in part on the spliced third data subset $DS3_T$ associated with the third update interval. The data points SM1, SM2, and SM3 can be plotted as a function of time. The determined stall margin remaining data points SM1, SM2, and SM3 can be routed to the control logic 124 (FIG. 3) as they are determined such that the stall margin remaining can actively be driven to the stall margin remaining target 134 (e.g., so that the stall margin error 138 can be driven to zero (0)). There are certain advantages in splicing the data by update intervals as previously noted.

Advantageously, in embodiments in which the one or more processing devices of the controller 120 are configured to splice the received data 130 into data subsets indicative of the operating characteristic of the compressor element over an update interval that is synchronized with an update rate of the one or more computing devices, synchronizing the splicing of the data 130 into data subsets with the update rate provides for efficient computing and predictable timing of the spliced data, which can provide for easier and more effective training of the machine-learned model 126. Further, in embodiments in which the one or more processing devices of the controller 120 are configured to splice the received data 130 into data subsets indicative of the operating characteristic of the compressor element over one or more revolutions of the engine, determining the stall margin remaining based on the data subsets can require more intense processing resources (e.g., than the synchronized method noted above) as the revolutions of the engine may or may not synch with the update rate of the controller 120 and/or FADEC system of which the controller 120 is the control device thereof, but can provide more accurate results (i.e., less signal variance).

Further, in some embodiments, the machine-learned model 126 is a multi-input machine-learned model. In such embodiments, as shown in FIG. 3, the one or more processing devices of the controller 120 are configured to determine, by the data consolidation model 128, a correlation value 134 based at least in part on the received data 130. Thereafter, the machine-learned model 126 then receives the correlation value 134 as shown. In such embodiments, the stall margin remaining 132 of the compressor element is determined, by the machine-learned model 126, based at least in part on the correlation value 134. For instance, as shown in FIG. 3, the machine-learned model 126 can apply a machine-learned algorithm to the raw data 130 received from one or more sensors (e.g., sensors 110, 112, 114) and the correlation value 134 received from the data consolidation model 128. As noted previously, the correlation value 134 can provide insight or information pertaining to the physics of the compressor element (that would not otherwise be available if the stall margin remaining was determined solely on the raw sensor data 130).

Figure 9:
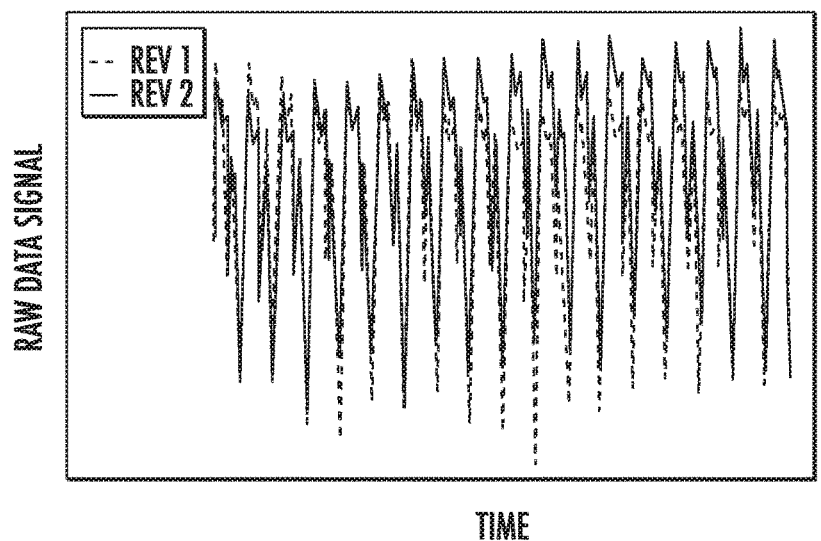
FIG. 9 provides a graph depicting a first signal and a second signal overlaying one another over time in accordance with an example embodiment of the present subject matter.

In some embodiments, the correlation value 134 is descriptive of a correlation between a first signal indicative of the operating characteristic of the compressor element over one or more first revolutions of the engine and a second signal indicative of the operating characteristic of the compressor element over one or more second revolutions of the engine. By way of example, FIG. 9 provides a graph depicting a first signal (Rev 1) and a second signal (Rev 2) overlaying the first signal Rev 1 over time. For this example, the first signal (Rev 1) is indicative of the pressure of the compressor element over a first revolution of the engine and the second signal (Rev 2) is indicative of the pressure of the compressor element over a subsequent second revolution of the engine. As noted above, the two signals overlay one another over time. The correlation value 134 is a calculated mathematical value that represents how similar two arrays of data are, e.g., how similar the pattern of the first signal (Rev 1) and second signal (Rev 2) are to one another. The data consolidation model 128 can use one or more Fourier Transforms to determine various characteristics of the first signal (Rev 1) and the second signal (Rev 2) signals so that the patterns of the signals can be compared more easily and accurately. As noted previously, the more comparable the patterns of the signals, the healthier the compressor element; in contrast, the less comparable the patterns of the signals, the less healthier the compressor element. The insight into the physics of the compressor element can enhance the machine-learned model's ability to quickly and accurately process the stall margin remaining 132, among other benefits and advantages.

In yet other embodiments, the correlation value 134 is descriptive of a correlation between a first signal indicative of the operating characteristic of the compressor element over a first time interval that is synchronized with an update rate of the one or more computing devices and a second signal indicative of the operating characteristic of the compressor element over a second time interval that is synchronized with an update rate of the one or more computing devices, or in this example, the controller 120 and/or FADEC system of which the controller 120 is the control device thereof. In such embodiments, the second time interval is later in time than the first time interval. A correlation value computed by the data consolidation model 128 in such a manner provides similar advantages as noted above.

By utilizing a machine-learned model to determine the stall margin remaining of a compressor element based on data from a high frequency sensor, significant improvements in signal accuracy and variation can be achieved compared to conventional methods for determining stall margin remaining. For instance, FIG. 10 provides a graph depicting the stall margin remaining output by the machine-learned model of the present disclosure versus the actual stall margin remaining of the compressor element for a given engine power setting and also depicts the stall margin remaining output by a conventional control system versus the actual stall margin remaining of the compressor element for the same given engine power setting.

Figure 10:
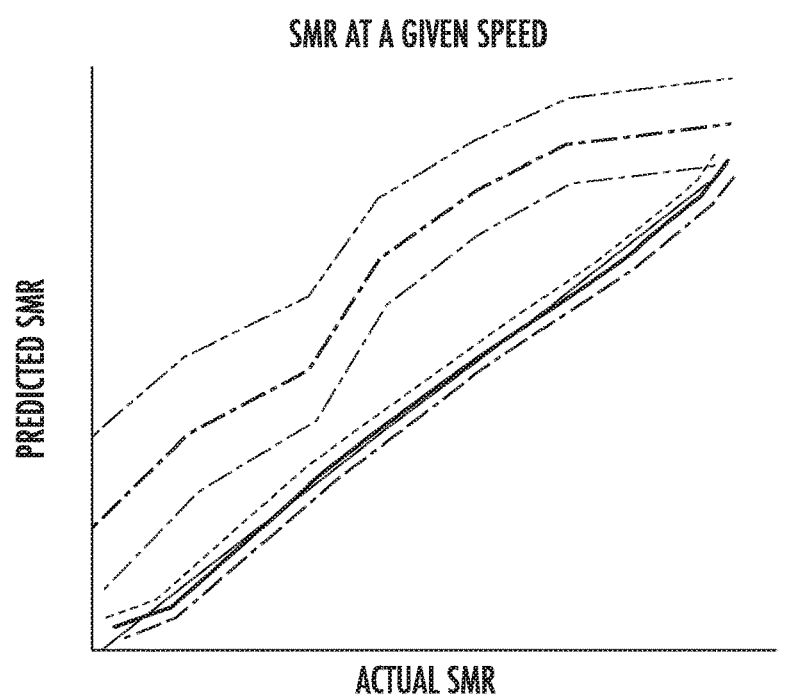
FIG. 10 provides a graph depicting a stall margin remaining output by a machine-learned model of the present disclosure versus the actual stall margin remaining of the compressor element for a given engine power setting and a stall margin remaining output by a conventional control system versus the actual stall margin remaining of the compressor element for a given engine power setting in accordance with an example embodiment of the present subject matter.

As shown in FIG. 10, a mean of the stall margin remaining derived using the machine learning signal processing control scheme described herein, denoted as ML_Mean, is shown relative to the ideal stall margin remaining, denoted as Ideal. Further, as depicted, a plus 2 Sigma standard deviation, denoted as ML_+2σ, and a negative 2 Sigma standard deviation, denoted as ML_-2σ, are shown relative to the mean ML_Mean. Notably, the mean ML_Mean (e.g., the stall margin remaining output from the machine-learned model 126) nearly overlays the ideal stall margin remaining Ideal. Indeed, the machine-learned model 126 can generate or output a very accurate stall margin remaining signal. Moreover, the machine-learn model 126 can output the stall margin remaining with less signal variation compared to conventional methods. For instance, as shown in FIG. 10, the plus 2 Sigma standard deviation ML_+2σ and negative 2 Sigma standard deviation ML_-2σ nearly overlay the mean ML_Mean, indicating that there is little variance in the stall margin remaining signal output by the machine-learned model 126.

In comparison, as further shown in FIG. 10, conventional control methods have not produced stall margin remaining signals with the same level of accuracy for active compressor stability management and also require too much processing time. In FIG. 10, a mean associated with the stall margin remaining calculated or predicted by conventional methods is denoted as C_Mean and is shown relative to the ideal stall margin remaining Ideal. Further, as depicted in FIG. 10, a plus 2 Sigma standard deviation, denoted as C_+2σ, and a negative 2 Sigma standard deviation, denoted as C_-2σ, are shown relative to the mean C_Mean. Notably, the mean C_Mean of the predicted/calculated stall margin remaining (i.e., the stall margin remaining output from a conventional processing scheme) is offset from the ideal stall margin remaining Ideal by a considerable margin. Further, as shown in FIG. 10, the plus 2 Sigma standard deviation C_+2σ and negative 2 Sigma standard deviation C_-2σ are in some instances nearly ±10 pts from the mean C_Mean of the predicted stall margin remaining signal, indicating that there is significant variance in the predicted stall margin remaining signal output by the conventional processing scheme. As will be appreciated by the graph of FIG. 10, significant improvements in signal accuracy and variation can be achieved by processing high frequency sensor data to determine a stall margin remaining utilizing the machine-learned model described herein compared to conventional control schemes.

Figure 11:
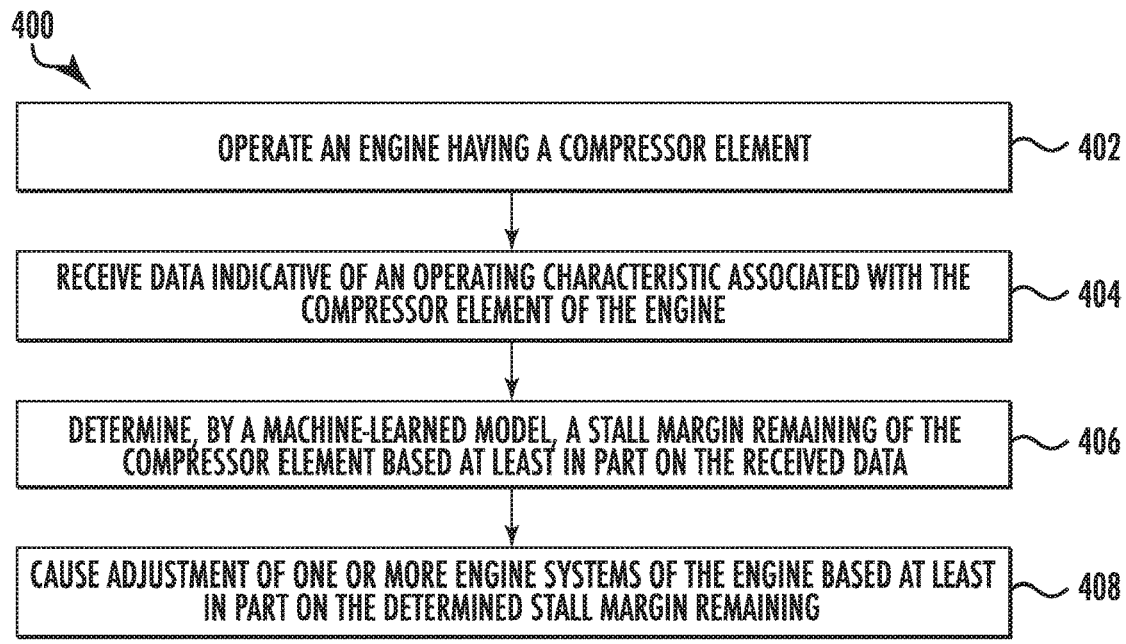
FIG. 11 provides a flow diagram of an exemplary method in accordance with an example embodiment of the present subject matter.

FIG. 11 provides a flow diagram of an exemplary method (400) for controlling a turbine engine in accordance with an embodiment of the present subject matter. For instance, the method (400) can be implemented to control the turbofan 10 of FIGS. 1 and 2. However, the method (400) can be implemented to control other engines having a compressor element as well. Some or all of the method (400) can be implemented by the control system 100 described herein. In addition, it will be appreciated that exemplary method (400) can be modified, adapted, expanded, rearranged and/or omitted in various ways without deviating from the scope of the present subject matter.

At (402), the method (400) includes operating an engine having a compressor element. For instance, the engine can be a gas turbine engine, such as e.g., the turbofan 10 of FIGS. 1 and 2. Moreover, the gas turbine engine can be another suitable type of gas turbine engine, such as, e.g., a turboprop, a turboshaft, a jet engine, an aeroderivative gas turbine engine, a marine gas turbine engine, etc. In yet other embodiments, the engine can be a different type of turbine engine, such as e.g., a steam turbine engine. The compressor element can be any suitable rotatable compressor. For instance, the compressor element can be the booster 22, the HP compressor 24, and/or the fan 38 of the turbofan 10 of FIGS. 1 and 2. In some implementations, the compressor element can be an annular array of compressor blades or stator vanes. In yet other embodiments, the compressor element can be a single blade or vane of an annular array.

At (404), the method (400) includes receiving, by one or more computing devices, data indicative of an operating characteristic associated with the compressor element of the engine. For instance, the one or more computing devices can be the engine controller 120 described herein. Moreover, the data indicative of the operating characteristics associated with the compressor element of the engine can be at least one of a pressure at the compressor element and a temperature at the compressor element. The data can be routed from one or more sensors positioned at or proximate the compressor element. For instance, the one or more sensors can be high bandwidth pressure sensors. For example, with reference to FIG. 2, the sensors can include the sensor 110 positioned along the booster 22 of the turbofan 10, the sensor 112 positioned along the HP compressor 24, and/or the sensor 114 positioned along the fan 38. The data can be received as an analog signal, e.g., as shown in FIG. 4. The frequency at which the sensors read the operating characteristic associated with the compressor element (e.g., the pressure fluctuations at the compressor element) can be on the order of two thousand times (2,000×) the update rate of the one or more computing devices, e.g., the controller 120 of the FADEC.

At (406), the method (400) includes determining, by a machine-learned model of the one or more computing devices, a stall margin remaining of the compressor element based at least in part on the received data. For instance, the machine-learned model 126 of the one or more computing devices can convert the raw sensor data indicative of the operating characteristic associated with the compressor element into the stall margin remaining of the compressor element, e.g., as shown by the ML_CASM line in FIG. 5. A machine-learned algorithm of the machine-learned model 126 can determine a highly accurate and high bandwidth stall margin remaining signal 132 compared to conventional processing schemes, e.g., as shown in FIG. 10.

In some implementations, the machine-learned model 126 is a neural network. For instance, in some implementations, the machined-learned model 126 is one of a recurrent neural network (RNN) and a convolutional neural network (CNN). In some implementations, the machine-learned model 126 is trained to recognize one or more characteristics of the AC component of the received raw data 130. For instance, the machine-learned model 126 can recognize frequency characteristics, amplitude characteristics, and/or other pattern or characteristics of the AC component of the raw data sensor signal. The machine-learned model can be trained to associate the frequency characteristics, amplitude characteristics, and/or other pattern or characteristics of the AC component of the raw data sensor signal with a stall margin remaining of the compressor element. Additionally, in yet other implementations, the machine-learned model 126 is trained to recognize one or more characteristics of the DC component of the received raw data signal 130 to enhance the accuracy of the determined stall margin remaining signal 132. The determined stall margin remaining signal 132 can be output by the model with equal to or greater than about ten times (10×) improvement in signal variation over conventional methods for determining stall margin remaining.

In some implementations, the method (400) includes splicing the received data into data subsets each indicative of the operating characteristic of the compressor element over a revolution of the engine. In such implementations, the stall margin remaining of the compressor element is determined, by the machine-learned model of the one or more computing devices, based at least in part on the data subsets each indicative of the operating characteristic of the compressor element over a revolution of the engine. As depicted in FIG. 7, the one or more computing devices can splice the received data 130 into data subsets by revolution of the engine. For instance, the data 130 can be spliced into a first data subset $DS1_{REV}$ for a first revolution of the engine, a second data subset $DS2_{REV}$ for a subsequent second revolution of the engine, and a third data subset $DS3_{REV}$ for a subsequent third revolution of the engine. That is, the data can be spliced into subsets based on the time it takes the engine to revolve around its axis of rotation. Thus, in some implementations, the splicing of the data is synchronous with the revolutions of the engine.

As noted previously, for each data subset $DS1_{REV}$, $DS2_{REV}$, $DS3_{REV}$ associated with a revolution of the engine, a corresponding stall margin remaining data point is determined by the machine-learned model 126. For this example, a stall margin remaining SM1 can be determined based at least in part on the spliced first data subset $DS1_{REV}$ associated with the first revolution, a stall margin remaining SM2 can be determined based at least in part on the spliced second data subset $DS2_{REV}$ associated with the second revolution, and a stall margin remaining SM3 can be determined based at least in part on the spliced third data subset $DS3_{REV}$ associated with the third revolution. The data points SM1, SM2, and SM3 can be plotted as a function of time. The determined stall margin remaining data points SM1, SM2, and SM3 can be routed to the control logic 124 (FIG. 3) as they are determined such that the stall margin remaining can actively be driven to the stall margin remaining target 134. As explained previously, the revolution of the engine can be based on the core speed (N2) of the engine if the compressor element is operatively coupled with the HP shaft 34 (FIG. 2) or can be based on the fan speed (N1) of the engine if the compressor element is operatively coupled with the LP shaft 36 or fan 38. There are certain advantages in splicing the data by revolution of the engine as previously noted.

In yet other implementations, the method (400) includes splicing the received data into data subsets each indicative of the operating characteristic of the compressor element over an update interval that is synchronized with an update rate of the one or more computing devices. In such implementations, the stall margin remaining of the compressor element is determined, by the machine-learned model of the one or more computing devices, based at least in part on the data subsets each indicative of the operating characteristic of the compressor element over an update interval that is synchronized with an update rate of the one or more computing devices. As depicted in FIG. 8, the one or more computing devices can splice the received data 130 into data subsets by an update interval that is synchronized with an update rate of the one or more computing devices. For instance, the data 130 can be spliced into a first data subset $DS1_T$ for a first update interval, a second data subset $DS2_T$ for a subsequent second update interval (which can be the same or a different amount of time as the first update interval), and a third data subset $DS3_T$ for a subsequent third update interval (which can be the same or a different amount of time as the first update interval and/or the second update interval). The update rate of the one or more computing devices can be fixed or variable, and consequently, the update interval can also be fixed or variable depending on the update rate.

As shown in FIG. 8, for each data subset $DS1_T$, $DS2_T$, $DS3_T$ associated with an update interval, a corresponding stall margin remaining data point is determined by the machine-learned model 126. For this example, a stall margin remaining SM1 can be determined based at least in part on the spliced first data subset $DS1_T$ associated with the first update interval, a stall margin remaining SM2 can be determined based at least in part on the spliced second data subset $DS2_T$ associated with the second update interval, and a stall margin remaining SM3 can be determined based at least in part on the spliced third data subset $DS3_T$ associated with the third update interval. The data points SM1, SM2, and SM3 can be plotted as a function of time. The determined stall margin remaining data points SM1, SM2, and SM3 can be routed to the control logic 124 (FIG. 3) as they are determined such that the stall margin remaining can actively be driven to the stall margin remaining target 134. There are certain advantages in splicing the data by update intervals as previously noted.

In yet further implementations, the method (400) includes determining, by a data consolidation model of the one or more computing devices, a correlation value based at least in part on the received data, wherein the correlation value is descriptive of a correlation between a first signal indicative of the operating characteristic of the compressor element over a first time period and a second signal indicative of the operating characteristic of the compressor element over a second time period, the second time period being later in time than the first time period. The method (400) can also include receiving, by the machine-learned model of the one or more computing devices, the correlation value. In such implementations, the stall margin remaining of the compressor element is determined, by the machine-learned model, based at least in part on the correlation value.

For instance, in some implementations, the machine-learned model 126 is a multi-input machine-learned model. In such implementations, as shown in FIG. 3, the one or more processing devices of the controller 120 are configured to determine, by the data consolidation model 128, a correlation value 134 based at least in part on the received data 130. Thereafter, the machine-learned model 126 can receive the correlation value 134. In such implementations, the stall margin remaining 132 of the compressor element is determined, by the machine-learned model 126, based at least in part on the correlation value 134. For instance, as shown in FIG. 3, the machine-learned model 126 can apply a machine-learned algorithm to the raw data 130 received from one or more sensors (e.g., sensors 110, 112, 114) and the correlation value 134 received from the data consolidation model 128. The correlation value 134 can provide insight or information pertaining to the physics of the compressor element.

In some implementations, the correlation value 134 is descriptive of a correlation between a first signal indicative of the operating characteristic of the compressor element over a first time period and a second signal indicative of the operating characteristic of the compressor element over a second time period, the second time period being later in time than the first time period. For instance, in some implementations, the first time period can be associated with a first revolution of the engine and the second time period can be associated with a second revolution of the engine. The second revolution can be a subsequent revolution of the first revolution. Thus, in such implementations, the first signal can be indicative of the operating characteristic of the compressor element over a first revolution of the engine and the second signal can be indicative of the operating characteristic of the compressor element over a subsequent second revolution of the engine.

In some implementations, the correlation value is representative of how similar two arrays of data are, e.g., how similar the pattern of the first signal and second signal are to one another. For instance, with reference to FIG. 9, a first signal (Rev 1) and a second signal (Rev 2) are shown overlaying one another over time. For this example, the first signal (Rev 1) is indicative of the pressure of the compressor element over a first revolution of the engine and the second signal (Rev 2) is indicative of the pressure of the compressor element over a subsequent second revolution of the engine. The data consolidation model 128 can use one or more Fourier Transforms to determine various characteristics of the first signal (Rev 1) and the second signal (Rev 2) so that the patterns or characteristics of the signals can be compared more easily and accurately. The more comparable the patterns of the signals, the healthier the compressor element; in contrast, the less comparable the patterns of the signals, the less healthier the compressor element. The insight into the physics of the compressor element can enhance the machine-learned model's ability to quickly and accurately process the stall margin remaining 132, among other benefits and advantages.

In some other implementations, the first time period can be associated with a first fixed interval and the second time period can be associated with a second fixed interval. The second fixed interval can be a subsequent interval of the first fixed interval. Thus, in such implementations, the first signal can be indicative of the operating characteristic of the compressor element over a first fixed interval and the second signal can be indicative of the operating characteristic of the compressor element over a second fixed interval.

At (408), the method (400) includes causing, by the one or more computing devices, adjustment of one or more engine systems of the engine based at least in part on the determined stall margin remaining. For instance, the one or more engine systems can be adjusted such that the mass flow through or across the compressor element can be changed. In this way, compressor stall can be avoided.

For instance, in some implementations, the one or more engine systems can include one or more variable geometry components. Thus, in such implementations, causing, by the one or more computing devices, adjustment of one or more engine systems of the engine based at least in part on the determined stall margin remaining at (408) includes causing, by the one or more computing devices, adjustment of one or more variable geometry components based at least in part on the determined stall margin remaining. For instance, the variable geometry components can include the variable geometry components 86 depicted in FIG. 2.

In other implementations, the one or more engine systems can include a fuel system, and more particularly, a fuel metering device of a fuel system. Thus, in such implementations, causing, by the one or more computing devices, adjustment of one or more engine systems of the engine based at least in part on the determined stall margin remaining at (408) includes causing, by the one or more computing devices, adjustment of a fuel metering device based at least in part on the determined stall margin remaining. For instance, the fuel metering device can include the fuel metering device 92 depicted in FIG. 2. When the fuel metering device is adjusted, the mass flow of fuel to the combustor 26 can be changed for a particular power setting.

In yet other implementations, the one or more engine systems can include a fan of the engine or a propeller operatively coupled thereto. In such implementations, causing, by the one or more computing devices, adjustment of one or more engine systems of the engine based at least in part on the determined stall margin remaining at (408) includes causing, by the one or more computing devices, adjustment of a fan of the engine based at least in part on the determined stall margin remaining. For instance, the fan can be the fan 38 depicted in FIG. 2. In other implementations, the fan can be a propeller operatively coupled with the engine. In some implementations, adjustment of the fan can be an adjustment of the fan speed for a given power setting. Additionally or alternatively, in some implementations, adjustment of the fan or propeller can be an adjustment of the pitch of the fan or propeller blades about their respective axes.

In some further implementations, the one or more engine systems can include one or more bleed valves, e.g., positioned along the core air flowpath of the engine. In such implementations, causing, by the one or more computing devices, adjustment of one or more engine systems of the engine based at least in part on the determined stall margin remaining at (408) includes causing, by the one or more computing devices, adjustment of a bleed valve of the engine based at least in part on the determined stall margin remaining. For instance, the bleed valve can be the bleed valve 88 depicted in FIG. 2. Adjustment of the bleed valve can change the mass flow through the core air flowpath of the engine, and consequently, the compressor element.

In some implementations, the method (400) includes setting, by the one or more computing devices, a target stall margin remaining associated with the compressor element. The controller 120 can set the stall margin target automatically or based on user input, e.g., from a pilot. The stall margin target is set at a higher margin than and is offset from stall so that there is sufficient margin between the operating line of the engine and stall. For instance, as shown in FIG. 5, the controller 120 can set the target stall margin ML_TSM such that it is offset from Stall by a desired margin.

Further, in some implementations, the method (400) includes determining a stall margin error based at least in part on the determined stall margin remaining and the target stall margin remaining. In such implementations, the one or more computing devices cause adjustment of the one or more engine systems based at least in part on the determined stall margin error. For instance, as shown in FIG. 6, the machine-learned model 126 can output a stall margin remaining 132. At the summation block 140, a difference between the output stall margin remaining 132 and the target stall margin can be determined. This difference is the stall margin error 138. The stall margin error 138 can be routed to the control logic 124 so that instructions for adjusting one or more engine systems 95 can be determined based at least in part on the determined stall margin error 138. The control logic 124 can generate one or more commands indicative of instructions for adjusting the one or more engine systems 95 based at least in part on the stall margin error 138. The control commands 136 can be routed to the engine systems 95, e.g., so that the engine system 95 can change the mass flow through the compressor element so that the stall margin error 138 is ultimately driven to zero (0). Stated differently, the engine systems 95 are adjusted based on the control commands 136 so that the stall margin remaining is driven to the target stall margin 134.

Figure 12:
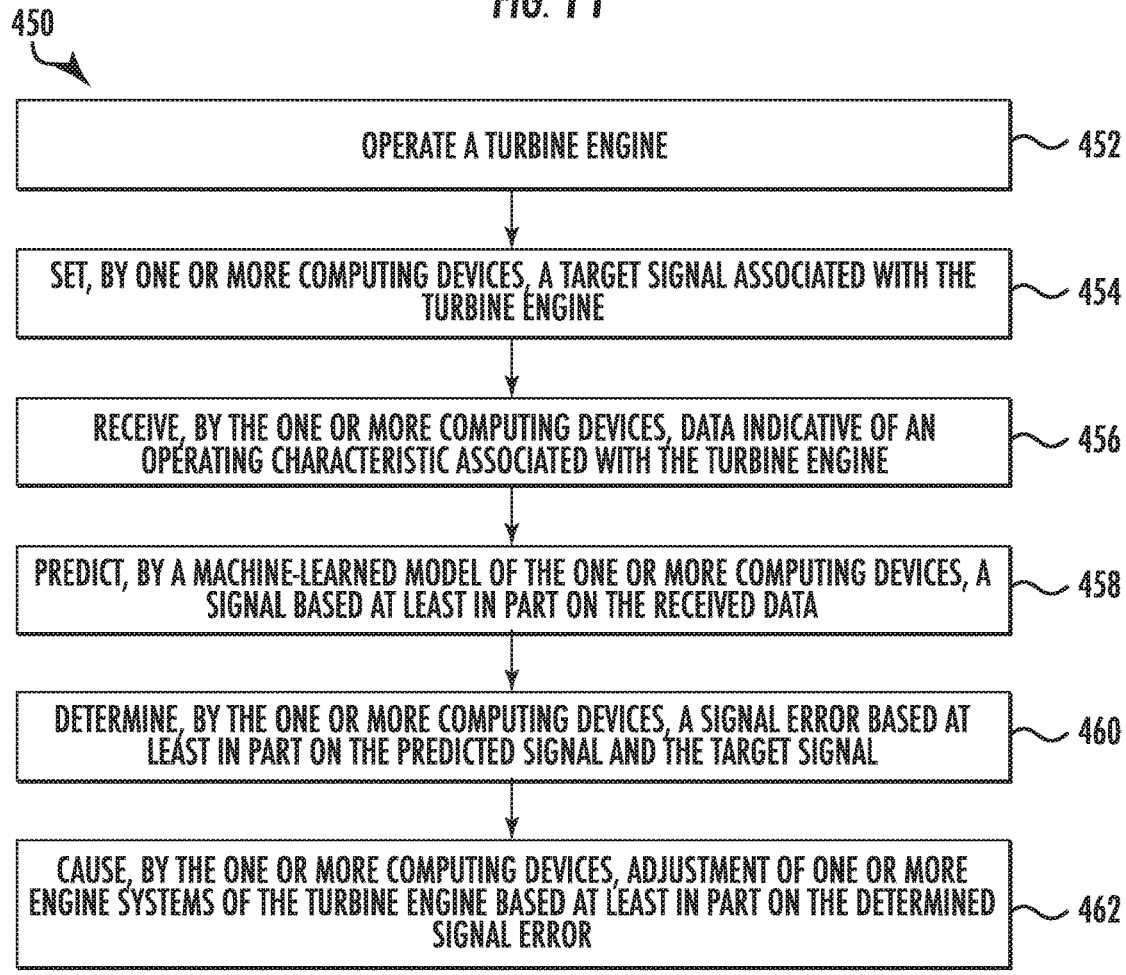
FIG. 12 provides a flow diagram of another exemplary method in accordance with an example embodiment of the present subject matter.

FIG. 12 provides a flow diagram of an exemplary method (450) for controlling a turbine engine in accordance with an embodiment of the present subject matter. For instance, the method (450) can be implemented to control the turbofan 10 of FIGS. 1 and 2. However, the method (450) can be implemented to control other types and configurations of turbine engines as well. Some or all of the method (450) can be implemented by the control system 100 described herein. In addition, it will be appreciated that exemplary method (450) can be modified, adapted, expanded, rearranged and/or omitted in various ways without deviating from the scope of the present subject matter.

At (452), the method (450) includes operating the turbine engine. For instance, the engine can be a gas turbine engine, such as e.g., the turbofan 10 of FIGS. 1 and 2. Moreover, the gas turbine engine can be another suitable type of gas turbine engine, such as, e.g., a turboprop, a turboshaft, a jet engine, an aeroderivative gas turbine engine, a marine gas turbine engine, etc. In yet other embodiments, the engine can be a different type of turbine engine, such as e.g., a steam turbine engine.

At (454), the method (450) includes setting, by one or more computing devices, a target signal associated with the turbine engine. For instance, the target signal can be a target stall margin, e.g., as shown in FIG. 5. In other implementations, the target signal can be any other target, threshold, or operating line of the engine that is sought, e.g., to improve engine performance, efficiency, thrust, etc.

At (456), the method (450) includes receiving, by the one or more computing devices, data indicative of an operating characteristic associated with the turbine engine. For instance, the data can be high frequency data received from a high bandwidth, high frequency sensor. The operating characteristic can be any suitable characteristic indicative of the operating conditions of the turbine engine, e.g., pressure, temperature, etc. The data can be received as an analog signal, e.g., as shown in FIG. 4. The frequency at which the sensors read the operating characteristic associated with the turbine engine can be on the order of two thousand times (2,000×) the update rate of the one or more computing devices, e.g., the controller 120 of the FADEC system.

At (458), the method (450) includes predicting, by a machine-learned model of the one or more computing devices, a signal based at least in part on the received data. For instance, the machine-learned model can predict a signal (e.g., stall margin remaining) that can be used for controlling the engine. The machine-learned model can predict the signal based on any of the techniques or methods described herein. Further, machine-learned models running onboard a control processor (e.g., on one or more computing devices of a FADEC system) can be trained to interpret sensor data in real time to predict, convert, or otherwise determine signals relating to, without limitation, component operability or stall margin (as described above), component health (e.g., deterioration, burst pipes, line leaks, etc.), vibration signal processing, and/or sensor fault detection.

At (460), the method (450) includes determining, by the one or more computing devices, a signal error based at least in part on the predicted signal and the target signal. For instance, the signal error can be calculated as the difference between the predicted signal and the target signal.

At (462), the method (450) includes causing, by the one or more computing devices, adjustment of one or more engine systems of the turbine engine based at least in part on the determined signal error. The one or more computing devices can cause adjustment of the engine systems to drive the signal error to zero (0), or stated differently, the one or more computing devices can cause adjustment of the engine systems to drive the predicted signal to the target signal. In this way, the desired performance, efficiency, etc. of the engine can be achieved. In yet other implementations, such as implementations in which the target signal and predicted signals relate to component health, at (462) the one or more computing devices can cause adjustment of the engine systems to use or operate a particular component (e.g., an unhealthy component) in a different way, e.g., to extend the time-on-wing of the engine). In yet further implementations, such as implementations in which the target signal and predicted signals relate to vibration signal processing, at (462) the one or more computing devices can cause adjustment of the engine systems, e.g., to reduce the vibration of the engine generally or the particular engine component experiencing an undesirable amount vibration.

Figure 13:
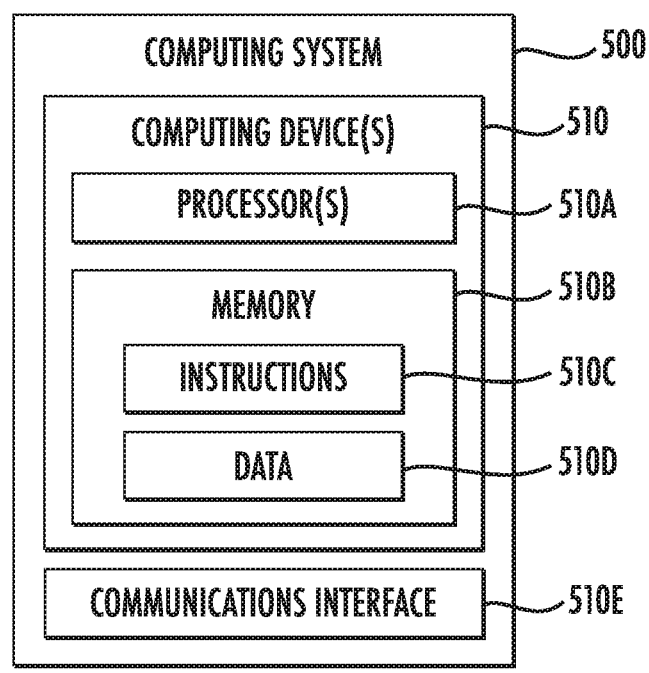
FIG. 13 provides an example computing system in accordance with an example embodiment of the present subject matter.

FIG. 13 provides an example computing system 500 according to example embodiments of the present disclosure. The controller 120 described herein can include various components and perform various functions of the computing system 500 described below, for example.

As shown in FIG. 13, the computing system 500 can include one or more computing device(s) 510. The computing device(s) 510 can include one or more processor(s) 510A and one or more memory device(s) 510B. The one or more processor(s) 510A can include any suitable processing device, such as a microprocessor, microcontroller, integrated circuit, logic device, and/or other suitable processing device. The one or more memory device(s) 510B can include one or more computer-readable media, including, but not limited to, non-transitory computer-readable media, RAM, ROM, hard drives, flash drives, and/or other memory devices.

The one or more memory device(s) 510B can store information accessible by the one or more processor(s) 510A, including computer-readable instructions 510C that can be executed by the one or more processor(s) 510A. The instructions 510C can be any set of instructions that when executed by the one or more processor(s) 510A, cause the one or more processor(s) 510A to perform operations. In some embodiments, the instructions 510C can be executed by the one or more processor(s) 510A to cause the one or more processor(s) 510A to perform operations, such as any of the operations and functions for which the computing system 500 and/or the computing device(s) 510 are configured, such as e.g., operations for controlling an engine as described herein. For instance, the methods (400), (450) can be implemented in whole or in part by the computing system 500. Accordingly, the methods (400), (450) can be at least partially a computer-implemented method such that at least some of the steps of the methods (400), (450) are performed by one or more computing devices, such as the exemplary computing device 510 of the computing system 500. The instructions 510C can be software written in any suitable programming language or can be implemented in hardware. Additionally, and/or alternatively, the instructions 510C can be executed in logically and/or virtually separate threads on processor(s) 510A. The memory device(s) 510B can further store data 510D that can be accessed by the processor(s) 510A. For example, the data 510D can include models, databases, etc.

The computing device(s) 510 can also include a network interface 510E used to communicate, for example, with the other components of system 500 (e.g., via a network). The network interface 510E can include any suitable components for interfacing with one or more network(s), including for example, transmitters, receivers, ports, controllers, antennas, and/or other suitable components. One or more external devices, such as remote computing system 200 (FIG. 2), can be configured to receive one or more commands or data from the computing device(s) 510 or provide one or more commands or data to the computing device(s) 510.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A control system for an engine having a compressor element, the control system comprising:
one or more computing devices having one or more memory devices and one or more processing devices, the one or more memory devices storing computer-readable instructions that can be executed by the one or more processing devices to perform operations, in performing the operations, the one or more processing devices are configured to:
receive data indicative of an operating characteristic associated with the compressor element;
splice the received data into data subsets indicative of the operating characteristic associated with the compressor element, each data subset of the data subsets includes a time series of data having a plurality of data points between an initial time and an end time, the plurality of data points of each data subset having a unique initial time; and
determine, by a machine-learned model, a stall margin remaining of the compressor element based at least in part on the data subsets.

2. The control system of claim 1, wherein the one or more processing devices are further configured to:
cause adjustment of one or more engine systems based at least in part on the determined stall margin remaining.

3. The control system of claim 2, wherein the one or more processing devices are further configured to:
determine a stall margin error based at least in part on the determined stall margin remaining and a target stall margin remaining, and wherein the one or more processing devices are configured to cause adjustment of the one or more engine systems based at least in part on the determined stall margin error.

4. The control system of claim 1, wherein the machine-learned model is a neural network.

5. The control system of claim 4, wherein the neural network is at least one of a recurrent neural network and a convolutional neural network.

6. The control system of claim 1, wherein the one or more processing devices are configured to receive the data indicative of the operating characteristic associated with the compressor element from a high frequency sensor.

7. The control system of claim 1, wherein the operating characteristic associated with the compressor element is the operating characteristic associated with the compressor element over one or more revolutions of the engine.

8. The control system of claim 1, wherein the operating characteristic associated with the compressor element is the operating characteristic associated with the compressor element over an update interval that is synchronized with an update rate of the one or more computing devices.

9. The control system of claim 1, wherein the machine-learned model is a multi-input machine-learned model, and wherein the one or more processing devices are further configured to:
 determine, by a data consolidation model of the one or more computing devices, a correlation value based at least in part on the received data, wherein the correlation value is descriptive of a correlation between a first signal indicative of the operating characteristic associated with the compressor element over one or more first revolutions of the engine and a second signal indicative of the operating characteristic associated with the compressor element over one or more second revolutions of the engine;
 receive, by the machine-learned model of the one or more computing devices, the correlation value, and
 wherein the stall margin remaining of the compressor element is determined, by the machine-learned model, based at least in part on the correlation value.

10. The control system of claim 1, wherein the operating characteristic associated with the compressor element is the operating characteristic associated with the compressor element at a fixed interval.

11. The control system of claim 1, wherein the machine-learned model is trained to recognize one or more characteristics of an AC component of the received data indicative of the operating characteristic associated with the compressor element.

12. The control system of claim 11, wherein the machine-learned model is trained to recognize one or more characteristics of a DC component of the received data indicative of the operating characteristic associated with the compressor element.

13. A method, comprising:
 operating an engine having a compressor element and a control system, the control system comprising one or more computing devices having one or more memory devices and one or more processing devices, the one or more memory devices storing computer-readable instructions that can be executed by the one or more processing devices to perform the method;
 receiving, by the one or more computing devices, data indicative of an operating characteristic associated with the compressor element of the engine;
 splicing, by the one or more computing devices, the received data into data subsets indicative of the operating characteristic associated with the compressor element, each data subset of the data subsets includes a time series of data having a plurality of data points between an initial time and an end time, the plurality of data points of each data subset having a unique initial time; and
 determining, by a machine-learned model of the one or more computing devices, a stall margin remaining of the compressor element based at least in part on the data subsets.

14. The method of claim 13, further comprising:
 setting, by the one or more computing devices, a target stall margin remaining associated with the compressor element.

15. The method of claim 14, further comprising:
 determining a stall margin error based at least in part on the determined stall margin remaining and the target stall margin remaining; and
 causing, by the one or more computing devices, adjustment of one or more engine systems of the engine based at least in part on the determined stall margin error.

16. The method of claim 13, wherein the machine-learned model is a neural network, and wherein the neural network is one of a recurrent neural network and a convolutional neural network.

17. The method of claim 13, further comprising:
 splicing the received data into the data subsets indicative of the operating characteristic associated with the compressor element over a revolution of the engine, and
 wherein the stall margin remaining of the compressor element is determined, by the machine-learned model of the one or more computing devices, based at least in part on the data subsets indicative of the operating characteristic associated with the compressor element over the revolution of the engine.

18. The method of claim 13, further comprising:
 splicing the received data into the data subsets indicative of the operating characteristic associated with the compressor element over an update interval that is synchronized with an update rate of the one or more computing devices, and
 wherein the stall margin remaining of the compressor element is determined, by the machine-learned model of the one or more computing devices, based at least in part on the data subsets indicative of the operating characteristic associated with the compressor element over the update interval that is synchronized with an update rate of the one or more computing devices.

19. The method of claim 13, further comprising:
 determining, by a data consolidation model of the one or more computing devices, a correlation value based at least in part on the received data, wherein the correlation value is descriptive of a correlation between a first signal indicative of the operating characteristic associated with the compressor element over a first time period and a second signal indicative of the operating characteristic associated with the compressor element over a second time period, the second time period being later in time than the first time period; and
 receiving, by the machine-learned model of the one or more computing devices, the correlation value, and
 wherein the stall margin remaining of the compressor element is determined, by the machine-learned model, based at least in part on the correlation value.

20. A non-transitory computer-readable media comprising computer-executable instructions, which, when executed by one or more processing devices of a control system for an engine, cause the one or more processing devices to:
- receive data indicative of an operating characteristic associated with a compressor element of the engine;
- splice the received data into data subsets indicative of the operating characteristic of the compressor element, each data subset of the data subsets includes a time series of data having a plurality of data points between an initial time and an end time, the plurality of data points of each data subset having a unique initial time; and
- determine, by executing a machine-learned model, a stall margin remaining of the compressor element based at least in part on the data subsets.

* * * * *